Figure 7:
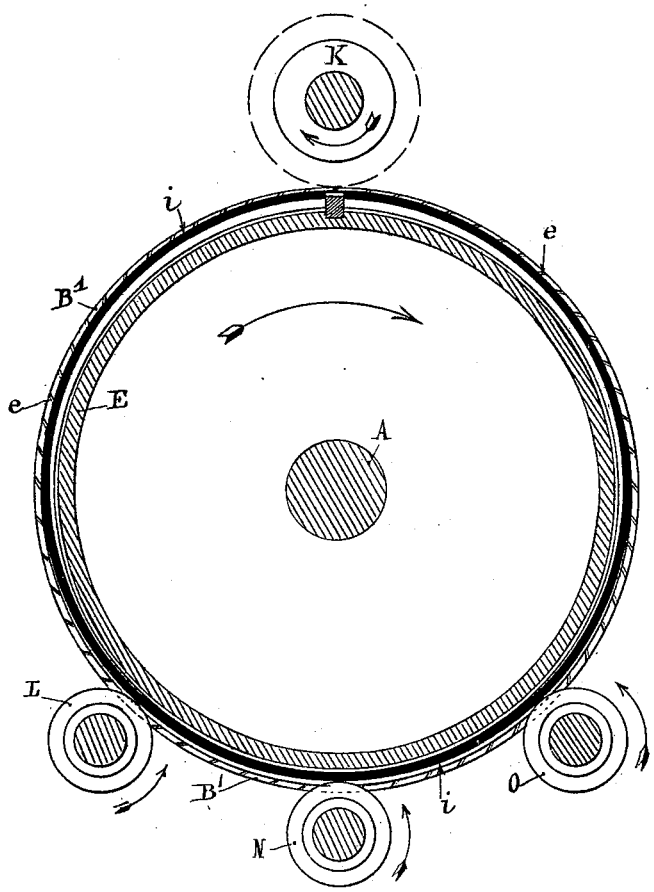

No. 619,979. Patented Feb. 21, 1899.
J. D. MOREL.
MACHINE FOR CLEANING AND CARDING WOOL, COTTON, &c.
(Application filed Jan. 18, 1897.)
(No Model.) 6 Sheets—Sheet 1.
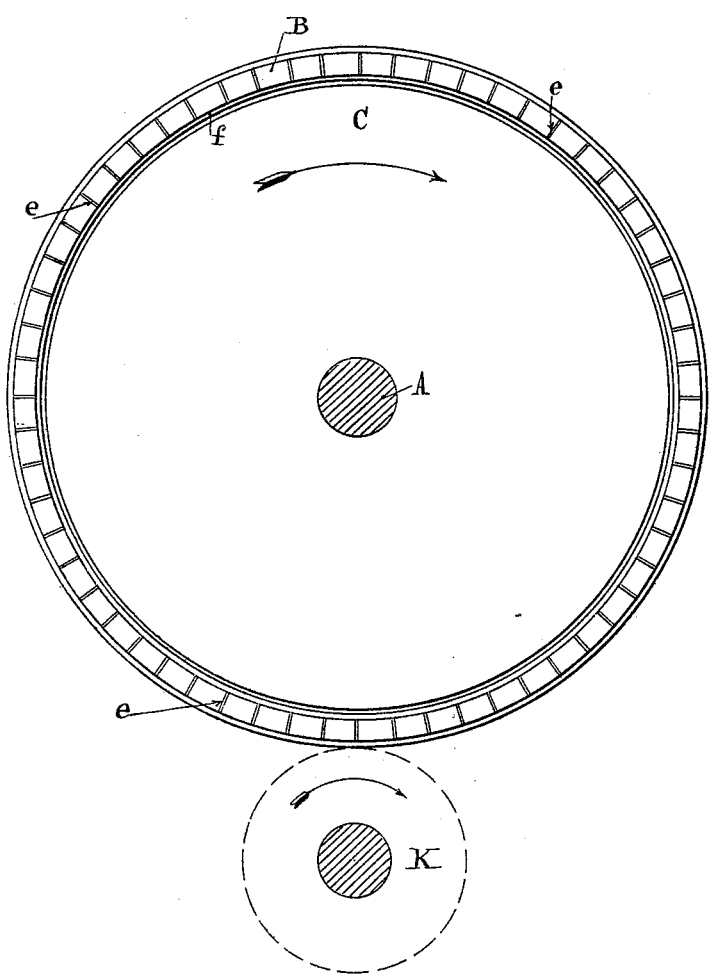
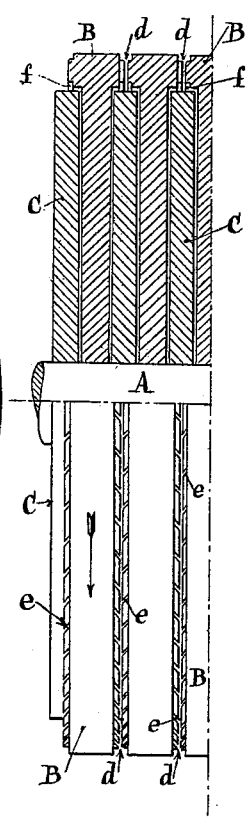
Witnesses.
Inventor.
Jules D. Morel,
By H. A. de Vos,
Attorney.
THE NORRIS PETERS CO., PHOTO-LITHO., WASHINGTON, D. C.

No. 619,979. Patented Feb. 21, 1899.
J. D. MOREL.
MACHINE FOR CLEANING AND CARDING WOOL, COTTON, &c.
(Application filed Jan. 18, 1897.)
(No Model.) 6 Sheets—Sheet 2.
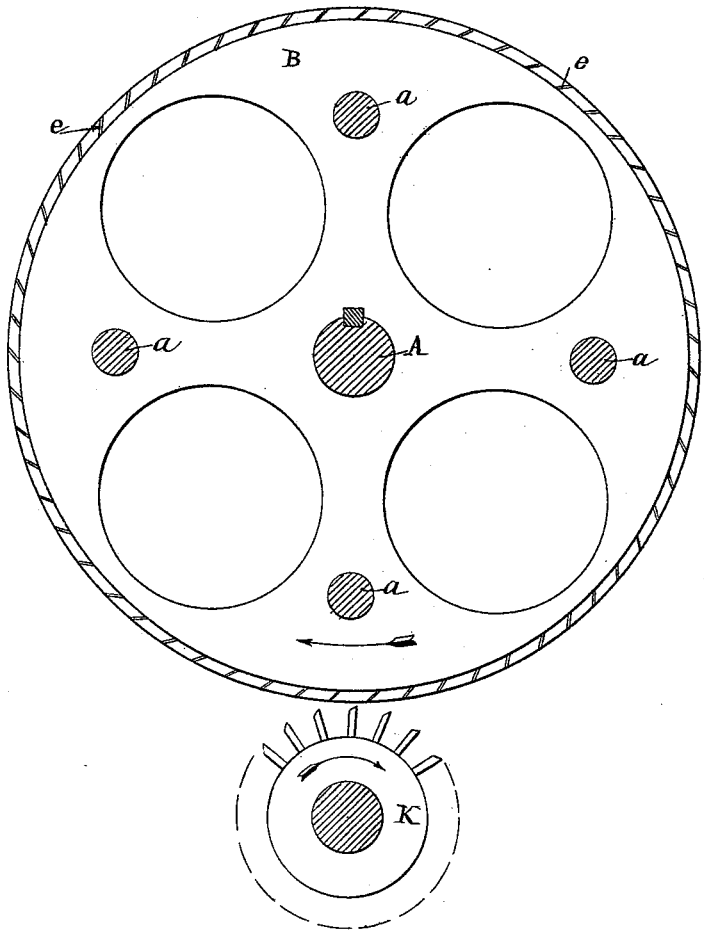
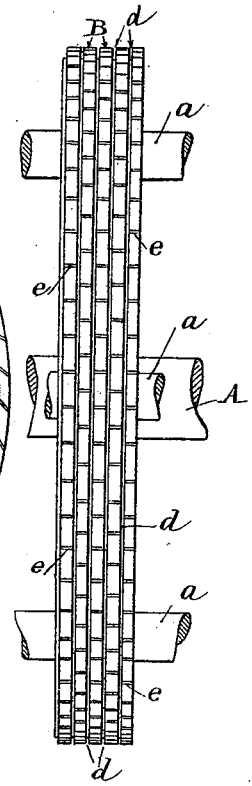

No. 619,979. Patented Feb. 21, 1899.
J. D. MOREL.
MACHINE FOR CLEANING AND CARDING WOOL, COTTON, &c.
(Application filed Jan. 18, 1897.)
(No Model.) 6 Sheets—Sheet 3.
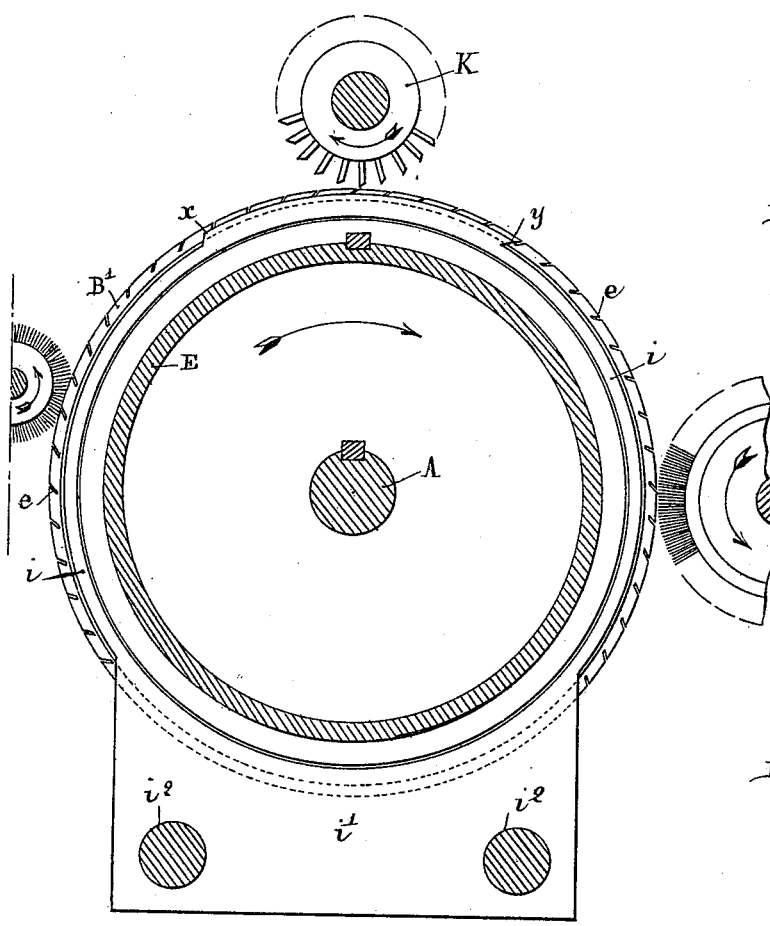
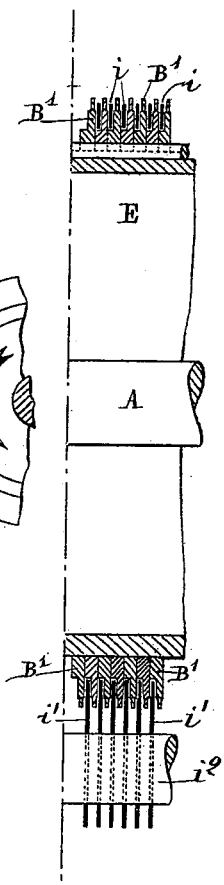
Witnesses.
J. C. Lebret.
O. Block.
Inventor.
Jules D. Morel,
By H. Adolvs.
Attorney.
THE NORRIS PETERS CO., PHOTO-LITHO., WASHINGTON, D. C.

No. 619,979. Patented Feb. 21, 1899.
J. D. MOREL.
MACHINE FOR CLEANING AND CARDING WOOL, COTTON, &c.
(Application filed Jan. 18, 1897.)

(No Model.) 8 Sheets—Sheet 4.

Witnesses.
J. Chebret.
O. Block

Inventor.
Jules D. Morel,
By H. A. de Vos.
Attorney.

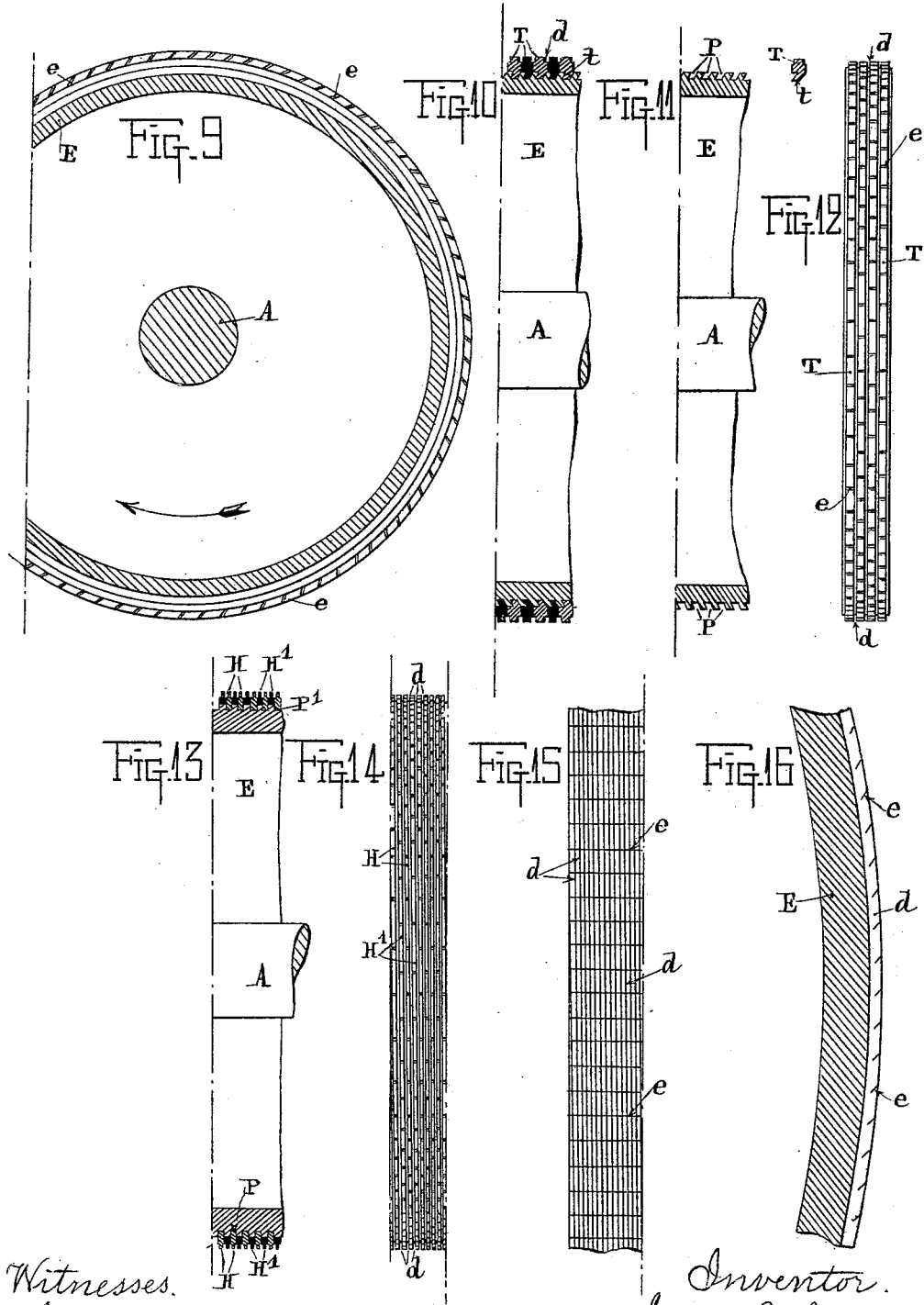

No. 619,979. Patented Feb. 21, 1899.
J. D. MOREL.
MACHINE FOR CLEANING AND CARDING WOOL, COTTON, &c.
(Application filed Jan. 18, 1897.)
(No Model.) 6 Sheets—Sheet 6.
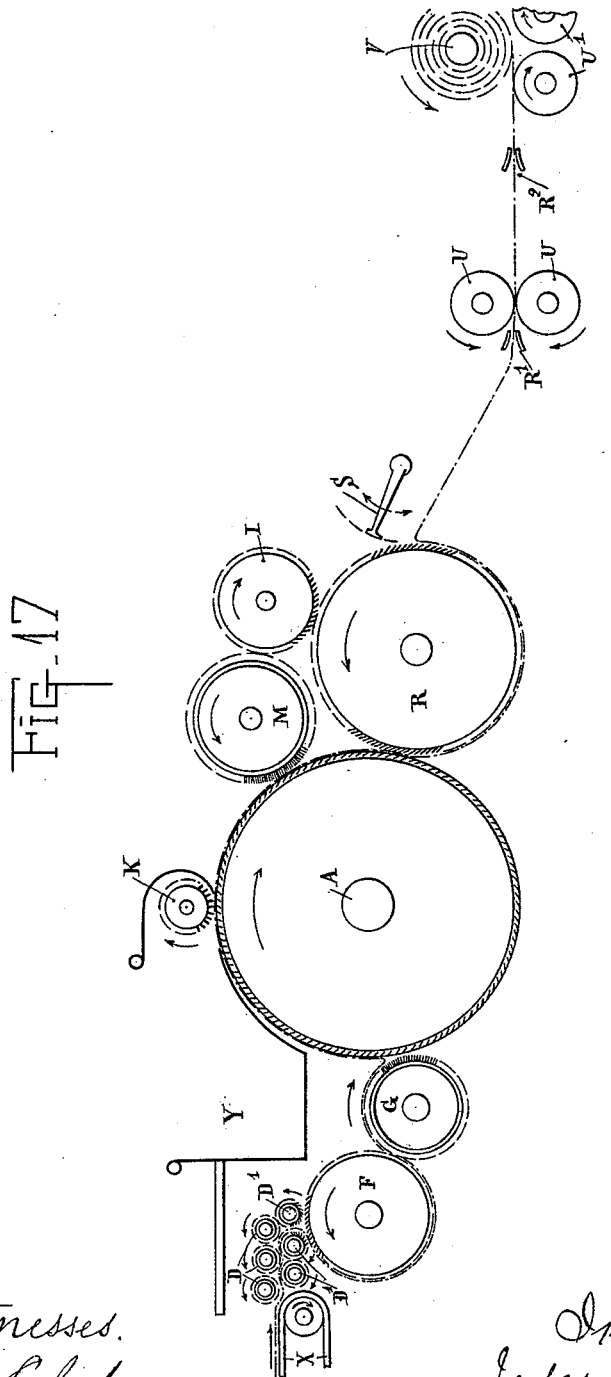
Witnesses.
J. Chebret.
O. Block.
Inventor.
Jules D. Morel,
By H. A. de Vos.
Attorney.

UNITED STATES PATENT OFFICE.

JULES DÉSIRÉ MOREL, OF ROUBAIX, FRANCE.

MACHINE FOR CLEANING AND CARDING WOOL, COTTON, &c.

SPECIFICATION forming part of Letters Patent No. 619,979, dated February 21, 1899.

Application filed January 18, 1897. Serial No. 619,540. (No model.)

*To all whom it may concern:*

Be it known that I, JULES DÉSIRÉ MOREL, a citizen of the French Republic, residing at Roubaix, France, have invented certain new and useful Improvements in Machines for Cleaning and Carding Wool, Cotton, and other Filamentary Matter, (for which I have obtained Letters Patent in France, No. 246,375, dated April 8, 1895; in Germany, No. 85,086, dated May 7, 1895; in Austria, No. 45/3,871, dated October 16, 1895; in Belgium, No. 115,195, dated April 13, 1895; in England, No. 29,584, dated December 23, 1896; in Austria, No. 47/234, dated December 28, 1896; in Russia, No. 789, dated January 2, 1897, and No. 13,598, dated January 14, 1897; in Italy, No. 43,538/199, dated December 26, 1896; in Switzerland, No. 13,599, dated December 23, 1896, and in Spain, No. 20,138, dated December 24, 1896,) of which the following is a description.

The scutching of filamentary matter, as wool, cotton, &c., has for its purpose to clean the same before being submitted to the operation of the carding-machine.

Numerous processes have been devised and numerous machines constructed, and I have devoted a large amount of labor and study to this question and have devised a new machine for the preparation of filamentary matter, adapted to substitute the carding and other machines now used. The essential novelty of this machine is to be found in the construction of a take-in cylinder designed to be used with alternately-moving feeders, which latter are not shown, as they are old and well known. The filamentary matter is fed into this take-in cylinder by the feeders, so that the feeders will engage in small grooves, while the burs and other impurities remain at the surface of the take-in cylinder and may thus be readily removed by the burring-roller. To attain this purpose, I have devised several arrangements, which may be used and will yield a good result, all these different arrangements being of course based upon the same principle.

I have illustrated my invention in the annexed drawings, making a part of this specification, and wherein—

Figure 8:
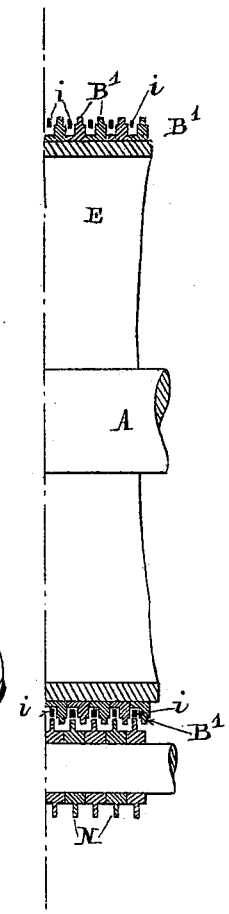

Figure 1 is a transverse section of a take-in cylinder formed of grooved disks and plates. Fig. 2 is a front view of part of the cylinder, partly in section. Fig. 3 is a transverse section of a take-in cylinder formed of a plurality of disks, grooves of a certain depth being provided between such disks to take in the fiber. Fig. 4 is a front view of part of such cylinder. Fig. 5 is a transverse section of a take-in cylinder formed of toothed collars keyed upon a core and separated by rigid rings. Fig. 6 shows a longitudinal section of part of such cylinder. Fig. 7 is a transverse section of a take-in cylinder similar to the one shown in Fig. 5, but with movable rings resting on suitable rollers. Fig. 8 is a longitudinal section of such cylinder. Figs. 9 to 16 show in section and in side view a take-in cylinder formed of a roller the circumference of which is provided with a helicoidal groove adapted to receive a suitably-shaped wire. Fig. 17 is a schematic view of a complete machine provided with a take-in cylinder of my invention.

The take-in cylinder illustrated in Figs. 1 and 2 is constructed as follows: Disks B and plates C are alternately mounted upon the shaft A. The disks B are larger in diameter than the plate C and are provided at their circumference with a double circular flange, and these flanges together form the circumference of the take-in cylinder. The disks B are consequently separated by the plates C; but their flanges, overlapping the plates, are located so near to each other that only a distance of two-tenths to three-tenths of a millimeter is left between the adjacent flanges of the successive disks, thus forming a series of very narrow circular grooves $d$ on the cylinder. Moreover, other narrow grooves $e$, of two to three millimeters depth, are provided on the surfaces of the disks B in an oblique direction toward the circular grooves $d$. Between the outer circumference of the plates C and the inner circumference of the projecting flanges of the disks B is left an annular space of two-tenths to three-tenths of a millimeter. The feeders are moved in a direction parallel to the shaft A—*i. e.*, perpendicular to the rotary motion of the take-in cylinder. It will be readily understood that the filamentary matter thus conveyed by the feeder to the take-in cylinder will, owing to the tenuity of the fiber, engage in the several grooves of the cylinder and seek to penetrate more and more into these grooves; but said grooves being too narrow to admit the impurities, same will remain on the surface and be removed by the burring-rollers.

Figs. 3 and 4 illustrate a take-in cylinder of the same principle. In this construction the plates C are eliminated and the disks are assembled and locked together by bolts $a$, which pass through their entire thickness. As in the other arrangement, these disks are provided with circular very narrow grooves $d$, of three millimeters depth, formed with a saw on both edges of the disks. Normal transverse grooves $e$ are also provided over the whole circumference of the cylinder. These transverse grooves may also be arranged obliquely.

Figs. 5 and 6 illustrate a take-in cylinder formed of a cylindrical core E, solidary with the shaft A, and around which are keyed collars B', provided with transverse grooves $e$. Between the collars B' are arranged rigid rings $i$, kept in position by their base-pieces $i'$ and bolts $i^2$ and provided from the point marked $x$ to the point marked $y$ with a projection adapted to keep the burs and other impurities in upward position and to submit same to the action of the burring-roller. This purpose may also be obtained, as shown in Figs. 7 and 8, by making the rings $i$ movable. In this case the projections are eliminated and their function is performed by the eccentrical configuration of the rings, which rest on rollers L N O, keeping the rings in an eccentric position toward the core. In these two constructions the taking in of the filamentary matter is always effected in the same manner.

The arrangement shown in Figs. 9 to 12 is formed of a cylinder E, around which is provided a helicoidal groove P, oblique in relation to the surface of the cylinder and adapted to receive the base $t$ of a metallic wire T, so formed that when it is arranged in place it presents a helicoidal groove $d$ and transverse grooves $e$ of about two-tenths to three-tenths of a millimeter, which grooves form the essential feature of the invention.

As shown in Figs. 13 and 14, the above-described construction may be modified by giving the helicoidal groove P' the same width as the space left between its spires. In this groove I arrange a metal wire H, the upper end of which is over a depth of about three millimeters, reduced in thickness. When this wire is in position, a second wire H is arranged between the spires of the first one. The base part of this second ring is necessarily shorter than that of the wire H, and its upper part, also reduced in thickness, is placed on the same level with the upper part of wire H.

Figs. 15 and 16, drawn to a larger scale than the others, illustrate in an exterior view and section part of a cylinder simplified in regard to its construction. It consists of a metallic core E, around which is provided a helicoidal groove $d$ of a few millimeters depth, intersected by a suitable number of grooves $e$ of the same width, but less depth, than the helicoidal groove.

In Fig. 17, which presents a schematic view of the entire apparatus, I have illustrated, as an example only, the feeding of the matter to be cleaned by means of an endless cloth X, from where the matter becomes engaged in a double series of feeding-rollers D D', to be carried forward by a transporting-roller F, that conveys it to a rotary brush G, adapted to feed it to the take-in cylinder. From the take-in cylinder, at the upper part of which the matter is released from the impurities that are thrown in the receptacle Y, the cleaned fibers are conveyed under the oblique teeth of a roller R, from which they are removed by a vibrating comb S. The matter thus cleaned—wool, cotton, &c.—is in the form of a fleece and passes through a funnel R', at the end of which it is taken up by two pressing-rollers U. It is released from these rollers in the shape of a web and passes into a second funnel $R^2$. The web thus formed is rolled on a bobbin V, moved and held by two rotary rollers U'. The bobbin thus obtained may be submitted to all further necessary operations.

A brush M, acting as fly-wheel on the take-in cylinder, could sometimes carry off some fibers that adhere to it. In order to prevent the fiber from rolling upon this brush, I have provided a small cylinder I, the cards of which remove from the brush the fiber carried along by same and yield same to the roller R.

It is obvious that this arrangement of a combined carding-machine is only described as an example and may be varied in accordance with circumstances.

Having now described my invention, what I claim as new, and desire to secure by Letters Patent, is—

1. In a machine for cleaning and carding wool and other material, a take-in cylinder having its face formed with circumferentially-extending grooves of a size to receive the fiber and prevent burs and other foreign substances from entering the grooves, and with adjacent grooves extending transversely to the first-mentioned grooves and of a size to avoid cutting the fiber and to prevent burs and other foreign substances from entering the grooves, all substantially as described.

2. In a machine for cleaning and carding wool and other material, the take-in cylinder formed of the disks and alternating plates, the disks being larger in diameter than the plates and formed with lateral flanges, which flanges are spaced at a distance apart substantially as specified to form circumferentially-extending grooves of a width to receive the fiber and exclude burs and other foreign substances, said disks having also transverse grooves formed in a part thereof, substantially as and for the purposes described.

3. In a machine for cleaning and carding wool and other material, the take-in cylinder formed of the disks and alternating plates, the disks being larger in diameter than the plates and formed with lateral flanges which flanges are spaced at a distance substantially as specified, and the under faces of the flanges and upper faces of the plates being spaced apart, said disks having also transverse grooves formed in a part thereof, substantially as and for the purposes described.

4. In a machine for cleaning and carding wool and other material, the take-in cylinder formed of the disks and alternating plates, the disks being larger than the plates and formed with lateral flanges, which flanges are spaced apart at a distance substantially as specified to form circumferentially-extending grooves, and grooves $e$ of substantially the width specified and arranged obliquely to the direction of the first-mentioned grooves, substantially as and for the purposes described.

In testimony that I claim the foregoing I have hereunto set my hand this 10th day of December, 1896.

JULES DÉSIRÉ MOREL.

Witnesses:
JULES LEROUX,
EDMOND LECROIX.